(12) United States Patent
Zhang et al.

(10) Patent No.: US 11,956,039 B2
(45) Date of Patent: Apr. 9, 2024

(54) METHOD AND NETWORK DEVICE FOR BEAM VECTOR SELECTION

(71) Applicant: Telefonaktiebolaget LM Ericsson (publ), Stockholm (SE)

(72) Inventors: Zhan Zhang, Beijing (CN); Huaisong Zhu, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 194 days.

(21) Appl. No.: 17/764,346

(22) PCT Filed: Sep. 30, 2019

(86) PCT No.: PCT/CN2019/109415
§ 371 (c)(1),
(2) Date: Mar. 28, 2022

(87) PCT Pub. No.: WO2021/062614
PCT Pub. Date: Apr. 8, 2021

(65) Prior Publication Data
US 2022/0345186 A1 Oct. 27, 2022

(51) Int. Cl.
H04B 7/06 (2006.01)
H04B 7/0408 (2017.01)

(52) U.S. Cl.
CPC ......... H04B 7/0617 (2013.01); H04B 7/0408 (2013.01)

(58) Field of Classification Search
CPC ............................. H04B 7/0617; H04B 7/0408
See application file for complete search history.

(56) References Cited

U.S. PATENT DOCUMENTS

| 2003/0190897 | A1  | 10/2003 | Lei et al. |           |
|--------------|-----|---------|------------|-----------|
| 2009/0179797 | A1* | 7/2009  | Kwon       | H01Q 1/246 |
|              |     |         |            | 342/368   |
| 2015/0016379 | A1* | 1/2015  | Nam        | H04B 7/0617 |
|              |     |         |            | 370/329   |
| 2015/0043673 | A1  | 2/2015  | Lee et al. |           |

(Continued)

FOREIGN PATENT DOCUMENTS

| CN | 110166094 A   | 8/2019 |
|----|---------------|--------|
| WO | 2019178464 A1 | 9/2019 |

OTHER PUBLICATIONS

International Search Report and the Written Opinion of the International Searching Authority, issued in corresponding International Application No. PCT/CN2019/109415, dated Jun. 29, 2020, 9 pages.

(Continued)

*Primary Examiner* — Janice N Tieu
(74) *Attorney, Agent, or Firm* — Rothwell, Figg, Ernst & Manbeck, P.C.

(57) ABSTRACT

The present disclosure provides a method (100) in a network device. The method (100) includes: determining (110) a number, N, of sets of beam vectors by: creating a first set of beam vectors orthogonal to each other; and determining an n-th set of beam vectors each obtained by linear combination of two or more beam vectors from the (n−1)-th set of beam vectors, where N and n are integers and N≥n>1. The method (100) further includes: selecting (120), from one or more of the N sets, a plurality of beam vectors for beamforming of a radio signal.

15 Claims, 6 Drawing Sheets

(56) References Cited

U.S. PATENT DOCUMENTS

2016/0142117 A1* 5/2016 Rahman ............... H04B 7/0486
                                                    375/267
2017/0170885 A1  6/2017 Li et al.
2018/0317214 A1  11/2018 Ding et al.
2019/0089428 A1* 3/2019 Bethanabhotla ..... H04B 7/0608
2019/0109629 A1  4/2019 Park et al.
2019/0341979 A1* 11/2019 Gao ..................... H04W 88/06

OTHER PUBLICATIONS

Ahmed et al. "Receive Antenna Selection and Hybrid Precoding for Receive Spatial Modulation in Massive MIMO Systems" WSA 2018, Mar. 14-16, 2018, Botchum, Germany, pp. 1-8.

Cheng et al., "Joint Multi-Beam Training and Codebook Design for Indoor High-Throughput Transmission Under Limited Training Steps", IEEE Transactions on Vehicular Technology, vol. 68, No. 6, Jun. 2019, pp. 5585-5597.

Gurevich et al., "On the Diagonalization of the Discrete Fourier Transform", arXiv:0808.3281v2, Dec. 27, 2008, pp. 1-16.

* cited by examiner

METHOD AND NETWORK DEVICE FOR BEAM VECTOR SELECTION

CROSS REFERENCE TO RELATED APPLICATION(S)

This application is a 35 U.S.C. § 371 National Phase Entry Application from PCT/CN2019/109415, filed Sep. 30, 2019, designating the United States, the disclosure of which is incorporated herein by reference in its entirety.

TECHNICAL FIELD

The present disclosure relates to wireless communication, and more particularly, to a method and a network device for beam vector selection.

BACKGROUND

Multi-antenna systems employ a number of antennas or antenna arrays to enable a higher reliability, a higher throughput, or both, by providing a transmission diversity gain, a spatial multiplexing gain and/or a beamforming gain. As one of multi-antenna techniques, beamforming focuses energy of signal transmission and/or reception into a targeted direction, leading to significant improvements in signal strengths received by communication devices. As a result, a system-wide spectrum efficiency can be achieved, especially when combined with proper scheduling of multiple terminal devices.

For the New Radio (NR) operating in millimeter wave (mmW) bands, due to high free space loss, high-gain directional beams may be beneficial to signal transmissions, including control signals, such as System Information and Synchronization Blocks (SSBs) and Channel State Information—Reference Signals (CSI-RSs), and data signals.

Different beamforming schemes, e.g., different beam vectors, may be desired for different types or purposes of signals to achieve a tradeoff between e.g., a beam sweeping efficiency and a beamforming gain. For example, a wide beam may have a high efficiency and a low latency in beam sweeping, but may have a low beamforming gain and thus a low signal quality, or vice versa.

There is thus a need for a beam vector design that can provide a high flexibility in selection of beam vectors for different types or purposes of signals.

SUMMARY

It is an object of the present disclosure to provide a method and a network device for beam vector selection, capable of providing a high flexibility in selection of beam vectors for different types or purposes of signals in an efficient manner.

According to a first aspect of the present disclosure, a method in a network device is provided. The method includes: determining a number, N, of sets of beam vectors by: creating a first set of beam vectors orthogonal to each other; and determining an n-th set of beam vectors each obtained by linear combination of two or more beam vectors from the (n−1)-th set of beam vectors, where N and n are integers and N≥n>1. The method further includes: selecting, from one or more of the N sets, a plurality of beam vectors for beamforming of a radio signal.

In an embodiment, the beam vectors in the first set can be eigen vectors spanning a Hilbert space.

In an embodiment, the first set of beam vectors can be created based on a Discrete Fourier Transform (DFT) based matrix.

In an embodiment, the DFT based matrix can be:

$$W = \frac{1}{\sqrt{K}} \begin{bmatrix} 1 & 1 & 1 & 1 & \cdots & 1 \\ 1 & w & w^2 & w^3 & \cdots & w^{K-1} \\ 1 & w^2 & w^4 & w^6 & \cdots & w^{2(K-1)} \\ 1 & w^3 & w^6 & w^9 & \cdots & w^{3(K-1)} \\ \vdots & \vdots & \vdots & \vdots & \ddots & \vdots \\ 1 & w^{K-1} & w^{2(K-1)} & w^{3(K-1)} & \cdots & w^{(K-1)(K-1)} \end{bmatrix},$$

where $w=e^{-\pi i/K}$, K is a number of beam vectors in the first set and i is an imaginary unit, and each column of W is one beam vector of the first set.

In an embodiment, each beam vector in the n-th set can be obtained by linear combination of two or more adjacent beam vectors from the (n−1)-th set of beam vectors.

In an embodiment, the plurality of beam vectors can be selected for beamforming of the radio signal for transmission to a terminal device based on an Angle of Arrival (AOA) of another radio signal from the terminal device.

In an embodiment, the first set of beam vectors can be created based on a random matrix.

In an embodiment, the first set of beam vectors can be created by: generating a random matrix X, where X is a K*K matrix; calculating $R=X^H X$, where $X^H$ is a Hermitian conjugate of X; and calculating an eigen decomposition of R as $R=Q^H DQ$. Each column of Q is one beam vector of the first set.

In an embodiment, the first set of beam vectors can be created based on a channel matrix.

In an embodiment, the first set of beam vectors can be created by: obtaining a channel matrix $H_m$ for each of a number, M, of terminal devices, where $H_m$ is a $T_m \times T_A$ matrix for an m-th terminal device out of the M terminal devices, m is an integer and M≥m>1, $T_A$ is a number of antennas at the network device and $T_A$=K, and $T_m$ is a number of antennas at the m-th terminal device; calculating $R_m = H_m^H H_m$, where $H_m^H$ is a Hermitian conjugate of $H_m$; calculating a covariance of $R_m$ over the M terminal devices as $R=E(R_m)$, where E( ) denotes mathematical expectation; and calculating an eigen decomposition of R as $R=Q^H DQ$. Each column of Q is one beam vector of the first set.

In an embodiment, the plurality of beam vectors can be selected based on one or more of: a maximum allowable number of beams for a full spatial coverage sweeping or repetition of the radio signal during a period of time to cover a serving area, a targeted transmission or reception beamforming gain for the radio signal, or an allowable latency and/or a maximum period for a successful transmission or reception of the radio signal above a predetermined probability.

In an embodiment, the radio signal may be a System Information and Synchronization Signal Block (SSB), a Channel State Information—Reference Signal (CSI-RS) or a reference or payload signal for multi-layer or multi-user transmission.

In an embodiment, the plurality of beam vectors can be selected from the $n_1$-th set when the radio signal is the SSB, or from the $n_2$-th set when the radio signal is the CSI-RS, or from the $n_3$-th set when the radio signal is the reference or payload signal for multi-layer or multi-user transmission, wherein $n_1$, $n_2$ and $n_3$ are integers and $N \geq n_1 \geq n_2 \geq n_3 \geq 1$.

According to a second aspect of the present disclosure, a network device is provided. The network device includes a transceiver, a processor and a memory. The memory stores instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the router to perform the method according to the above first aspect.

With the embodiments of the present disclosure, a hierarchical design of beam vectors is introduced. An elementary (i.e., the first) set of beam vectors orthogonal to each other is created and the n-th set of beam vectors is determined such that each beam vector in the n-th set is obtained by linear combination of two or more beam vectors from the (n−1)-th set of beam vectors. Then, a plurality of beam vectors can be selected from one or more sets for beamforming of a radio signal. Such hierarchical design is highly flexible and efficient in selection of beam vectors for different types or purposes of signals, so as to achieve a desired tradeoff between e.g., a beam sweeping efficiency and a beamforming gain.

BRIEF DESCRIPTION OF THE DRAWINGS

The above and other objects, features and advantages will be more apparent from the following description of embodiments with reference to the figures, in which.

DETAILED DESCRIPTION

Figure 1:
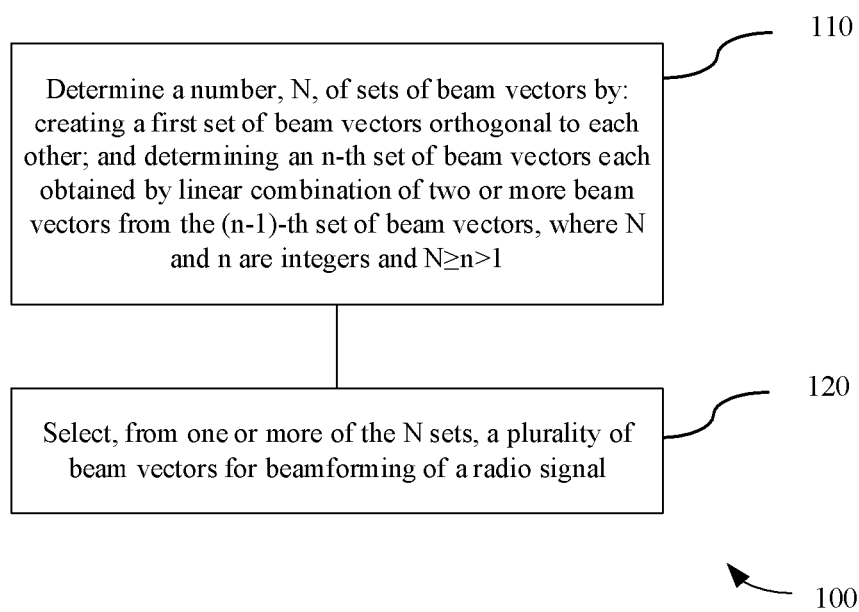
FIG. 1 is a flowchart illustrating a method for beam vector selection according to an embodiment of the present disclosure.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or (next) generation NodeB (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "network node" refers to a device connected to a network node such as a BS or an AP, e.g., via any appropriate network. For example, the network node may refer to a cloud server, a cloud computing node or any other node capable of data processing, computing and/or communicating information with one or more network devices.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like.

In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for beam vector selection according to an embodiment of the present disclosure. The method 100 can be performed at a network device, e.g., an eNB or gNB.

At block 110, a number, N, of sets of beam vectors are determined as follows, where N is an integer larger than 1.

In the block 110, first of all, a first set (also referred to as "elementary set" hereinafter) of beam vectors orthogonal to each other is created. Here, the beam vectors in the elementary set can be eigen vectors spanning a Hilbert space. Using eigen vectors spanning a Hilbert space is particularly advantageous as a Hilbert space is "complete" mathematically.

For example, let p denote the number of antennas for beamforming at the network device, q denote the number of beam vectors in the elementary set, and $V_j$, j=1, 2, ..., q, denote a beam vector in the elementary set. For simplicity, it is assumed that p=q in the following.

In an example, the elementary set can be created based on a Discrete Fourier Transform (DFT) based matrix. For example, the DFT based matrix can be:

$$W = \frac{1}{\sqrt{K}} \begin{bmatrix} 1 & 1 & 1 & 1 & \cdots & 1 \\ 1 & w & w^2 & w^3 & \cdots & w^{K-1} \\ 1 & w^2 & w^4 & w^6 & \cdots & w^{2(K-1)} \\ 1 & w^3 & w^6 & w^9 & \cdots & w^{3(K-1)} \\ \vdots & \vdots & \vdots & \vdots & \ddots & \vdots \\ 1 & w^{K-1} & w^{2(K-1)} & w^{3(K-1)} & \cdots & w^{(K-1)(K-1)} \end{bmatrix} \quad (1)$$

where $w=e^{-2\pi i/K}$, K is a number of beam vectors in the first set and i is an imaginary unit, and each column of W is one beam vector of the elementary set, i.e., $W=[V_1, V_2, \ldots, V_K]$.

Alternatively, the elementary set can be created based on a random matrix. In particular, the elementary set can be created by: generating a random matrix X, where X is a K*K matrix; calculating $R=X^H X$, where $X^H$ is a Hermitian conjugate of X; and calculating an eigen decomposition of R as $R=Q^H DQ$. In this case, each column of Q is one beam vector of the elementary set, i.e., $Q=[V_1, V_2, \ldots, V_K]$. Here, D is a diagonal matrix.

Alternatively, the elementary set can be created based on a channel matrix. In particular, the elementary set can be created by: obtaining a channel matrix $H_m$ for each of a number, M, of terminal devices, where $H_m$ is a $T_m \times T_A$ matrix for an m-th terminal device out of the M terminal devices, m is an integer and M≥m>1, $T_A$ is a number of antennas at the network device and $T_A=K$, and $T_m$ is a number of antennas at the m-th terminal device; calculating $R_m=H_m^H H_m$, where $H_m^H$ is a Hermitian conjugate of $H_m$; calculating a covariance of $R_m$ over the M terminal devices as $R=E(R_m)$, where E( ) denotes mathematical expectation; and calculating an eigen decomposition of R as $R=Q^H DQ$. In this case, each column of Q is one beam vector of the elementary set, i.e., $Q=[V_1, V_2, \ldots, V_K]$. Here, D is a diagonal matrix.

Then, an n-th set of beam vectors is determined, with each beam vector in the n-th set being obtained by linear combination of two or more beam vectors from the (n−1)-th set of beam vectors, where n is an integer and N≥n>1.

For example, let $U_c^n$, c=1, 2, . . . , $C_n$, denote a beam vector in the n-th set:

$$U_c^n = \begin{cases} \frac{1}{sqrt(s_{nc})} \sum_{k=1}^{s_{nc}} b_{ck}^n V_{ck}, \text{ for } n = 2 \\ \frac{1}{sqrt(s_{nc})} \sum_{k=1}^{s_{nc}} b_{ck}^n U_{ck}^{n-1}, \text{ for } n > 2 \end{cases} \quad (2)$$

where $C_n$ is the number of beam vectors in the n-th set, $V_{ck} \in V_c$ which is a subset of the elementary set {$V_1$, $V_2$ . . . , $V_K$} and contains beam vectors used for constituting $U_c^2$, $U_{ck}^{n-1} \in U_c^{n-1}$ which is a subset of the (n−1)-th set {$U_1^{n-1}$, $U_2^{n-1}$, . . . , $U_{c_{n-1}}^{n-1}$} and contains beam vectors used for constituting $U_c^n$ (n>2), $s_{nc}$ is the number of vectors in $V_c$ (n=2) or $U_c^{n-1}$ (n>2), $$\frac{1}{sqrt(s_{nc})}$$

is a linear amplitude normalization, and $b_{ck}^n$ is a linear combination coefficient.

As an example, each beam vector in the n-th set can be obtained by linear combination of two or more adjacent or non-adjacent beam vectors from the (n−1)-th set of beam vectors, e.g., when the elementary set is created according to Equation (1). For example, according to Equation (2), when N=4, K=8, $C_2$=4, $C_3$=2, $C_4$=1, $U_1^2$ can be obtained by linear combination of $V_1$ and $V_2$, $U_2^2$ can be obtained by linear combination of $V_3$ and $V_4$, $U_3^2$ can be obtained by linear combination of $V_5$ and $V_6$, $U_4^2$ can be obtained by linear combination of $V_5$ and $V_6$, $U_1^3$ can be obtained by linear combination of $V_7$ and $V_8$, $U_1^3$ can be obtained by linear combination of $U_1^2$ and $U_2^2$, $U_2^3$ can be obtained by linear combination of $U_3^2$ and $U_4^2$, and $U_1^4$ can be obtained by linear combination of $U_1^3$ and $U_2^3$.

It is to be noted here that each beam vector in the n-th set is not necessarily to be obtained by linear combination of the same number of beam vectors from the (n−1)-th set of beam vectors. That is, in Equation (2), for a given value of n, $s_{nc}$ may vary for different values of c.

At block 120, a plurality of beam vectors are selected from one or more of the N sets for beamforming of a radio signal.

For example, the plurality of beam vectors can be selected for beamforming of the radio signal for transmission to a terminal device based on an Angle of Arrival (AOA) of another radio signal from the terminal device, e.g., when the elementary set is created according to Equation (1). For a uniformly spaced linear array of antenna elements, the elementary set created according to Equation (1) is particularly advantageous in that it can indicate an actual angular sweeping of beams (azimuth, or elevation, depending on the array bore sight directions). Therefore, such elementary set is especially suitable to transmission schemes based on the AoA type of angular parameters. This feature can be exploited when a gNB is to track a Line of Sight (LoS) terminal device while it is moving. Such elementary set corresponds to increasing angles of the beams, and the ordering of the beam vectors is useful for gradually tracking the moving terminal device easily, e.g., by gradually increasing or decreasing the angle. Hence, according to AoAs of signals from the terminal device, beam vectors having increasing or decreasing indices can be selected for efficient searching or smooth tracking of the terminal device.

In an example, in the block 120, the plurality of beam vectors can be selected based on a maximum allowable number of beams for a full spatial coverage sweeping or repetition of the radio signal during a period of time to cover a serving area. For example, 3GPP defines that, for frequency bands <6 GHz, a maximum number of SSB sweeping beams should be smaller than or equal to 6; while for mmWave bands, up to 64 SSB beams can be supported. In practice, a gNB can flexibly configure different numbers of SSB beams.

If the configured number of SSB beams is small, beam vectors in a high-level set (i.e., having a large n value), i.e., "wide" beams, can be used to cover an entire serving area. Additionally or alternatively, the plurality of beam vectors can be selected based on a targeted transmission or reception beamforming gain for the radio signal, and/or an allowable latency and/or a maximum period for a successful transmission or reception of the radio signal above a predetermined probability. For example, beam vectors in a high-level set (i.e., having a large n value), i.e., "wide" beams, typically provide high efficiency, low latency, but low beamforming gain; while beam vectors in a low-level set (i.e., having a small n value), i.e., "narrow" beams, typically provide low efficiency, high latency, but high beamforming gain. The selection in the block 120 can be made based on a desired tradeoff among these factors.

Further, the beam vectors can be selected for different signals or purposes and/or at different phases, which may have different desired tradeoffs among the above factors. For example, the radio signal may include an SSB, a CSI-RS or a reference or payload signal for multi-layer or multi-user transmission. Accordingly, the plurality of beam vectors can be selected from the $n_1$-th set when the radio signal is the SSB, or from the $n_2$-th set when the radio signal is the CSI-RS, or from the $n_3$-th set when the radio signal is the reference or payload signal for multi-layer or multi-user transmission, where $n_1$, $n_2$ and $n_3$ are integers and N≥$n_1$≥$n_2$≥$n_3$≥1. For example, in a synchronization phase, the SSB may use wider beams for higher efficiency and lower latency. In a data transmission phase, the CSI-RS may use narrower beams than the SSB, while the signal for multi-layer or multi-user transmission may use even narrower beams (e.g., those in the elementary set) for higher beamforming gains and thus higher signal qualities.

Figure 2:
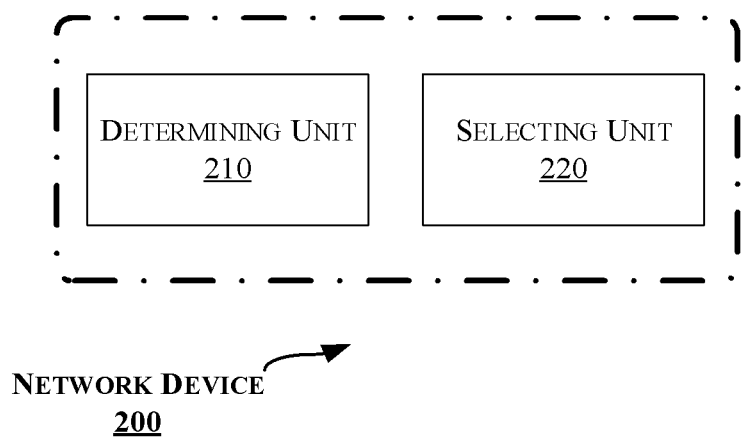
FIG. 2 is a block diagram of a network device according to an embodiment of the present disclosure.

Correspondingly to the method 100 as described above, a network device is provided. FIG. 2 is a block diagram of a network device 200 according to an embodiment of the present disclosure.

As shown in FIG. 2, the network device 200 includes a determining unit 210 configured to determine a number, N, of sets of beam vectors by: creating a first set of beam vectors orthogonal to each other; and determining an n-th set of beam vectors each obtained by linear combination of two or more beam vectors from the (n−1)-th set of beam vectors, where N and n are integers and N≥n>1. The network device 200 further includes a selecting unit 220 configured to select, from one or more of the N sets, a plurality of beam vectors for beamforming of a radio signal.

In an embodiment, the beam vectors in the first set can be eigen vectors spanning a Hilbert space.

In an embodiment, the first set of beam vectors can be created based on a Discrete Fourier Transform (DFT) based matrix.

In an embodiment, the DFT based matrix can be the matrix shown in the above Equation (1).

In an embodiment, each beam vector in the n-th set can be obtained by linear combination of two or more adjacent beam vectors from the (n−1)-th set of beam vectors.

In an embodiment, the selecting unit 220 can be configured to select the plurality of beam vectors for beamforming of the radio signal for transmission to a terminal device based on an Angle of Arrival (AOA) of another radio signal from the terminal device.

In an embodiment, the first set of beam vectors can be created based on a random matrix.

In an embodiment, the first set of beam vectors can be created by: generating a random matrix X, where X is a K*K matrix; calculating $R=X^H X$, where $X^H$ is a Hermitian conjugate of X; and calculating an eigen decomposition of R as $R=Q^H DQ$. Each column of Q is one beam vector of the first set.

In an embodiment, the first set of beam vectors can be created based on a channel matrix.

In an embodiment, the first set of beam vectors can be created by: obtaining a channel matrix $H_m$ for each of a number, M, of terminal devices, where $H_m$ is a $T_m \times T_A$ matrix for an m-th terminal device out of the M terminal devices, m is an integer and M≥m>1, $T_A$ is a number of antennas at the network device and $T_A=K$, and $T_m$ is a number of antennas at the m-th terminal device; calculating $R_m=H_m^H H_m$, where $H_m^H$ is a Hermitian conjugate of $H_m$; calculating a covariance of $R_m$ over the M terminal devices as $R=E(R_m)$, where E( ) denotes mathematical expectation; and calculating an eigen decomposition of R as $R=Q^H DQ$. Each column of Q is one beam vector of the first set.

In an embodiment, the selecting unit 220 can be configured to select the plurality of beam vectors based on one or more of: a maximum allowable number of beams for a full spatial coverage sweeping or repetition of the radio signal during a period of time to cover a serving area, a targeted transmission or reception beamforming gain for the radio signal, or an allowable latency and/or a maximum period for a successful transmission or reception of the radio signal above a predetermined probability.

In an embodiment, the radio signal may be a System Information and Synchronization Signal Block (SSB), a Channel State Information—Reference Signal (CSI-RS) or a reference or payload signal for multi-layer or multi-user transmission.

In an embodiment, the selecting unit 220 can be configured to select the plurality of beam vectors from the $n_1$-th set when the radio signal is the SSB, or from the $n_2$-th set when the radio signal is the CSI-RS, or from the $n_3$-th set when the radio signal is the reference or payload signal for multi-layer or multi-user transmission, wherein $n_1$, $n_2$ and $n_3$ are integers and $N \geq n_1 \geq n_2 \geq n_3 \geq 1$.

The determining unit 210 and the selecting unit 220 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 3:
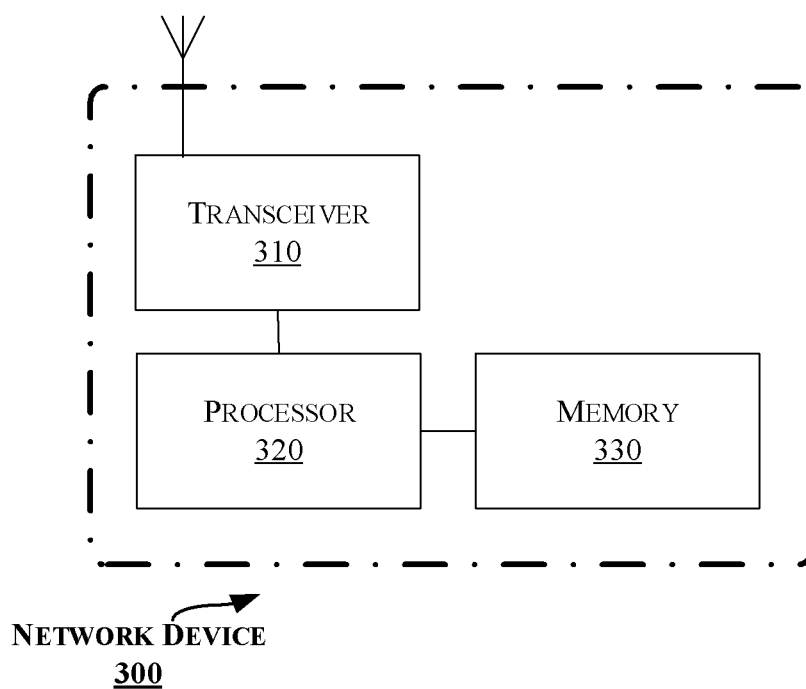
FIG. 3 is a block diagram of a network device according to another embodiment of the present disclosure.

FIG. 3 is a block diagram of a network device 300 according to another embodiment of the present disclosure.

The network device 300 includes a transceiver 310, a processor 320 and a memory 330. The memory 330 contains instructions executable by the processor 320 whereby the network device 300 is operative to perform the actions, e.g., of the procedure described earlier in conjunction with FIG. 1. Particularly, the memory 330 contains instructions executable by the processor 320 whereby the network device 300 is operative to: determine a number, N, of sets of beam vectors by: creating a first set of beam vectors orthogonal to each other; and determining an n-th set of beam vectors each obtained by linear combination of two or more beam vectors from the (n−1)-th set of beam vectors, where N and n are integers and N≥n>1; and select, from one or more of the N sets, a plurality of beam vectors for beamforming of a radio signal.

In an embodiment, the beam vectors in the first set can be eigen vectors spanning a Hilbert space.

In an embodiment, the first set of beam vectors can be created based on a Discrete Fourier Transform (DFT) based matrix.

In an embodiment, the DFT based matrix can be the matrix as shown in the above Equation (1).

In an embodiment, each beam vector in the n-th set can be obtained by linear combination of two or more adjacent beam vectors from the (n−1)-th set of beam vectors.

In an embodiment, the plurality of beam vectors can be selected for beamforming of the radio signal for transmission to a terminal device based on an Angle of Arrival (AOA) of another radio signal from the terminal device.

In an embodiment, the first set of beam vectors can be created based on a random matrix.

In an embodiment, the first set of beam vectors can be created by: generating a random matrix X, where X is a K*K matrix; calculating $R=X^H X$, where $X^H$ is a Hermitian conjugate of X; and calculating an eigen decomposition of R as $R=Q^H DQ$. Each column of Q is one beam vector of the first set.

In an embodiment, the first set of beam vectors can be created based on a channel matrix.

In an embodiment, the first set of beam vectors can be created by: obtaining a channel matrix $H_m$ for each of a number, M, of terminal devices, where $H_m$ is a $T_m \times T_A$ matrix for an m-th terminal device out of the M terminal devices, m is an integer and M≥m>1, $T_A$ is a number of antennas at the network device and $T_A=K$, and $T_m$ is a number of antennas at the m-th terminal device; calculating $R_m=H_m^H H_m$, where $H_m^H$ is a Hermitian conjugate of $H_m$; calculating a covariance of $R_m$ over the M terminal devices as $R=E(R_m)$, where E( ) denotes mathematical expectation; and calculating an eigen decomposition of R as $R=Q^H DQ$. Each column of Q is one beam vector of the first set.

In an embodiment, the plurality of beam vectors can be selected based on one or more of: a maximum allowable number of beams for a full spatial coverage sweeping or repetition of the radio signal during a period of time to cover a serving area, a targeted transmission or reception beamforming gain for the radio signal, or an allowable latency and/or a maximum period for a successful transmission or reception of the radio signal above a predetermined probability.

In an embodiment, the radio signal may be a System Information and Synchronization Signal Block (SSB), a Channel State Information—Reference Signal (CSI-RS) or a reference or payload signal for multi-layer or multi-user transmission.

In an embodiment, the plurality of beam vectors can be selected from the $n_1$-th set when the radio signal is the SSB, or from the $n_2$-th set when the radio signal is the CSI-RS, or from the $n_3$-th set when the radio signal is the reference or payload signal for multi-layer or multi-user transmission, wherein $n_1$, $n_2$ and $n_3$ are integers and $N \geq n_1 \geq n_2 \geq n_3 \geq 1$.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 320 causes the network device 300 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 4:
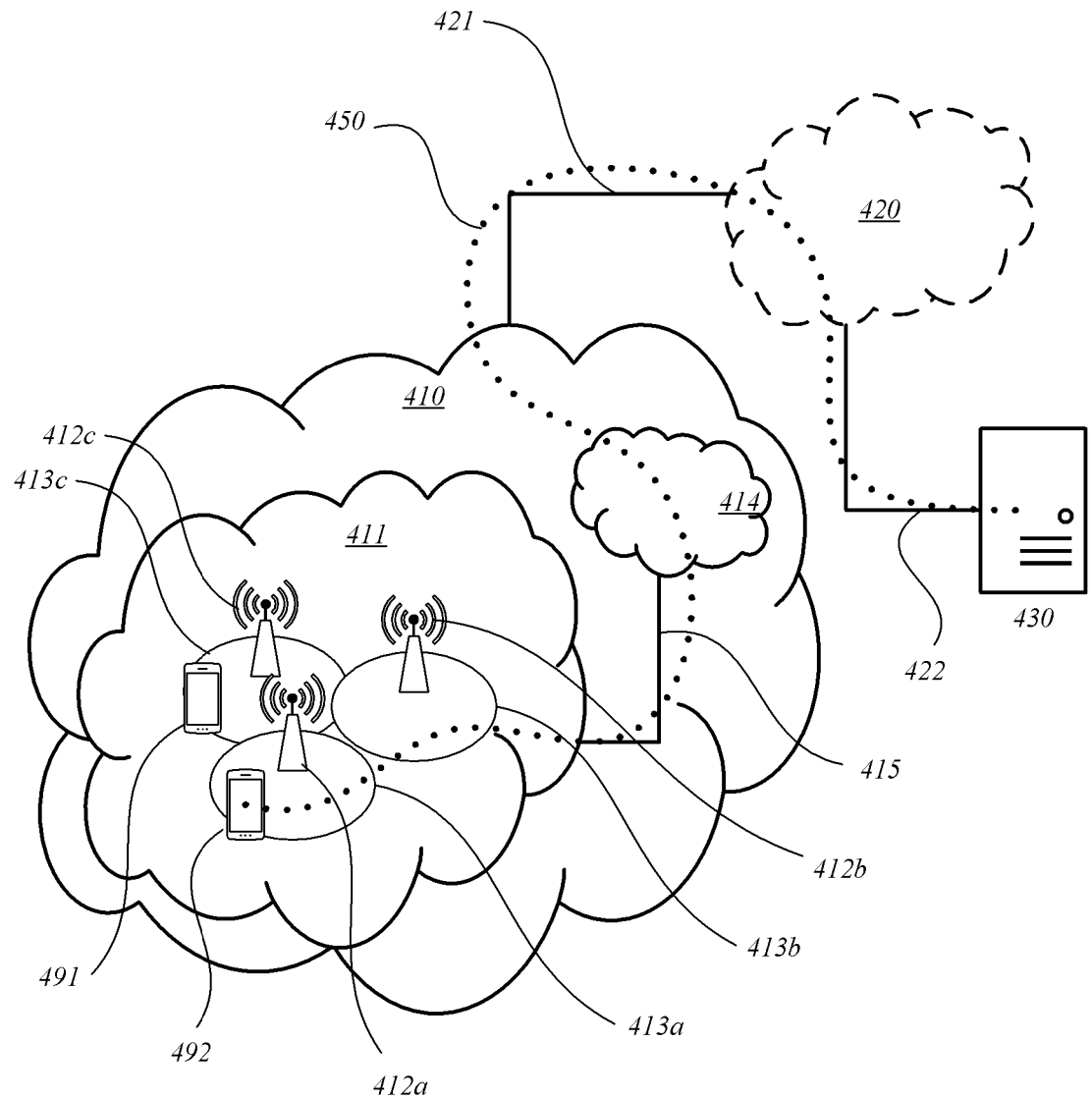
FIG. 4 schematically illustrates a telecommunication network connected via an intermediate network to a host computer.

With reference to FIG. 4, in accordance with an embodiment, a communication system includes a telecommunication network 410, such as a 3GPP-type cellular network, which comprises an access network 411, such as a radio access network, and a core network 414. The access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to the core network 414 over a wired or wireless connection 415. A first user equipment (UE) 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

The telecommunication network 410 is itself connected to a host computer 430, which may be embodied in the hardware and/or software of a standalone server, a cloud-implemented server, a distributed server or as processing resources in a server farm. The host computer 430 may be under the ownership or control of a service provider, or may be operated by the service provider or on behalf of the service provider. The connections 421, 422 between the telecommunication network 410 and the host computer 430 may extend directly from the core network 414 to the host computer 430 or may go via an optional intermediate network 420. The intermediate network 420 may be one of, or a combination of more than one of, a public, private or hosted network; the intermediate network 420, if any, may be a backbone network or the Internet; in particular, the intermediate network 420 may comprise two or more sub-networks (not shown).

The communication system of FIG. 4 as a whole enables connectivity between one of the connected UEs 491, 492 and the host computer 430. The connectivity may be described as an over-the-top (OTT) connection 450. The host computer 430 and the connected UEs 491, 492 are configured to communicate data and/or signaling via the OTT connection 450, using the access network 411, the core network 414, any intermediate network 420 and possible further infrastructure (not shown) as intermediaries. The OTT connection 450 may be transparent in the sense that the participating communication devices through which the OTT connection 450 passes are unaware of routing of uplink and downlink communications. For example, a base station 412 may not or need not be informed about the past routing of an incoming downlink communication with data originating from a host computer 430 to be forwarded (e.g., handed over) to a connected UE 491. Similarly, the base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In a communication system 500, a host computer 510 comprises hardware 515 including a communication interface 516 configured to set up and maintain a wired or wireless connection with an interface of a different communication device of the communication system 500. The host computer 510 further comprises processing circuitry 518, which may have storage and/or processing capabilities. In particular, the processing circuitry 518 may comprise one or more programmable processors, application-specific integrated circuits, field programmable gate arrays or combinations of these (not shown) adapted to execute instructions. The host computer 510 further comprises software 511, which is stored in or accessible by the host computer 510 and executable by the processing circuitry 518. The software 511 includes a host application 512. The host application 512 may be operable to provide a service to a remote user, such as a UE 530 connecting via an OTT connection 550 terminating at the UE 530 and the host computer 510. In providing the service to the remote user, the host application 512 may provide user data which is transmitted using the OTT connection 550.

The communication system 500 further includes a base station 520 provided in a telecommunication system and comprising hardware 525 enabling it to communicate with the host computer 510 and with the UE 530. The hardware 525 may include a communication interface 526 for setting up and maintaining a wired or wireless connection with an interface of a different communication device of the communication system 500, as well as a radio interface 527 for setting up and maintaining at least a wireless connection 570 with a UE 530 located in a coverage area (not shown in FIG. 5) served by the base station 520. The communication interface 526 may be configured to facilitate a connection 560 to the host computer 510. The connection 560 may be direct or it may pass through a core network (not shown in FIG. 5) of the telecommunication system and/or through one or more intermediate networks outside the telecommunication system. In the embodiment shown, the hardware 525 of the base station 520 further includes processing circuitry 528, which may comprise one or more programmable processors, application-specific integrated circuits, field programmable gate arrays or combinations of these (not shown)

adapted to execute instructions. The base station 520 further has software 521 stored internally or accessible via an external connection.

The communication system 500 further includes the UE 530 already referred to. Its hardware 535 may include a radio interface 537 configured to set up and maintain a wireless connection 570 with a base station serving a coverage area in which the UE 530 is currently located. The hardware 535 of the UE 530 further includes processing circuitry 538, which may comprise one or more programmable processors, application-specific integrated circuits, field programmable gate arrays or combinations of these (not shown) adapted to execute instructions. The UE 530 further comprises software 531, which is stored in or accessible by the UE 530 and executable by the processing circuitry 538. The software 531 includes a client application 532. The client application 532 may be operable to provide a service to a human or non-human user via the UE 530, with the support of the host computer 510. In the host computer 510, an executing host application 512 may communicate with the executing client application 532 via the OTT connection 550 terminating at the UE 530 and the host computer 510. In providing the service to the user, the client application 532 may receive request data from the host application 512 and provide user data in response to the request data. The OTT connection 550 may transfer both the request data and the user data. The client application 532 may interact with the user to generate the user data that it provides.

Figure 5:
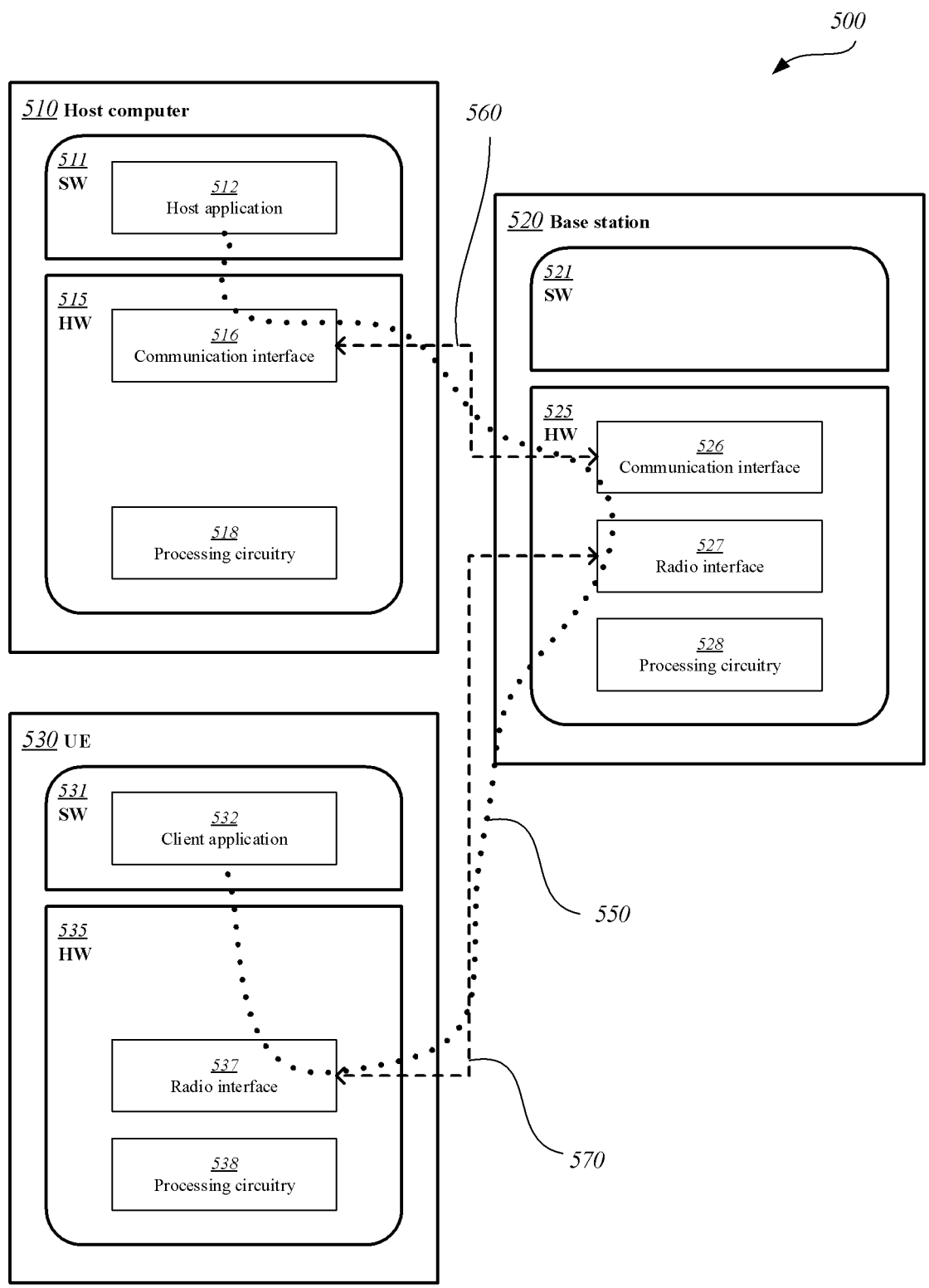
FIG. 5 is a generalized block diagram of a host computer communicating via a base station with a user equipment over a partially wireless connection.

It is noted that the host computer 510, base station 520 and UE 530 illustrated in FIG. 5 may be identical to the host computer 430, one of the base stations 412a, 412b, 412c and one of the UEs 491, 492 of FIG. 4, respectively. This is to say, the inner workings of these entities may be as shown in FIG. 5 and independently, the surrounding network topology may be that of FIG. 4.

In FIG. 5, the OTT connection 550 has been drawn abstractly to illustrate the communication between the host computer 510 and the use equipment 530 via the base station 520, without explicit reference to any intermediary devices and the precise routing of messages via these devices. Network infrastructure may determine the routing, which it may be configured to hide from the UE 530 or from the service provider operating the host computer 510, or both. While the OTT connection 550 is active, the network infrastructure may further take decisions by which it dynamically changes the routing (e.g., on the basis of load balancing consideration or reconfiguration of the network).

The wireless connection 570 between the UE 530 and the base station 520 is in accordance with the teachings of the embodiments described throughout this disclosure.

One or more of the various embodiments improve the performance of OTT services provided to the UE 530 using the OTT connection 550, in which the wireless connection 570 forms the last segment. More precisely, the teachings of these embodiments may improve data rate and/or latency and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 550 between the host computer 510 and UE 530, in response to variations in the measurement results. The measurement procedure and/or the network functionality for reconfiguring the OTT connection 550 may be implemented in the software 511 of the host computer 510 or in the software 531 of the UE 530, or both. In embodiments, sensors (not shown) may be deployed in or in association with communication devices through which the OTT connection 550 passes; the sensors may participate in the measurement procedure by supplying values of the monitored quantities exemplified above, or supplying values of other physical quantities from which software 511, 531 may compute or estimate the monitored quantities. The reconfiguring of the OTT connection 550 may include message format, retransmission settings, preferred routing etc.; the reconfiguring need not affect the base station 520, and it may be unknown or imperceptible to the base station 520.

Such procedures and functionalities may be known and practiced in the art. In certain embodiments, measurements may involve proprietary UE signaling facilitating the host computer's 510 measurements of throughput, propagation times, latency and the like. The measurements may be implemented in that the software 511, 531 causes messages to be transmitted, in particular empty or 'dummy' messages, using the OTT connection 550 while it monitors propagation times, errors etc.

Figure 6:
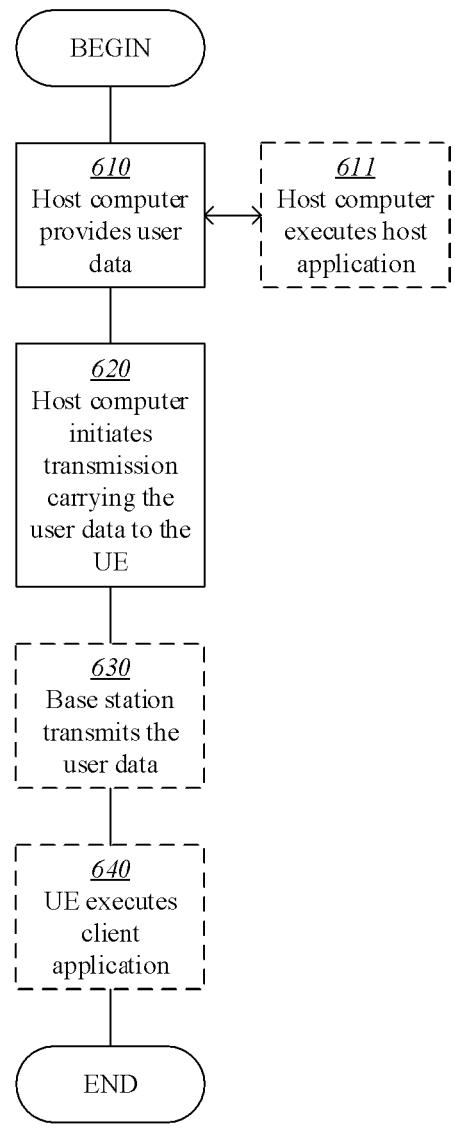
FIGS. 6 to 9 are flowcharts illustrating methods implemented in a communication system including a host computer, a base station and a user equipment.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In a first step 610 of the method, the host computer provides user data. In an optional substep 611 of the first step 610, the host computer provides the user data by executing a host application. In a second step 620, the host computer initiates a transmission carrying the user data to the UE. In an optional third step 630, the base station transmits to the UE the user data which was carried in the transmission that the host computer initiated, in accordance with the teachings of the embodiments described throughout this disclosure. In an optional fourth step 640, the UE executes a client application associated with the host application executed by the host computer.

Figure 7:
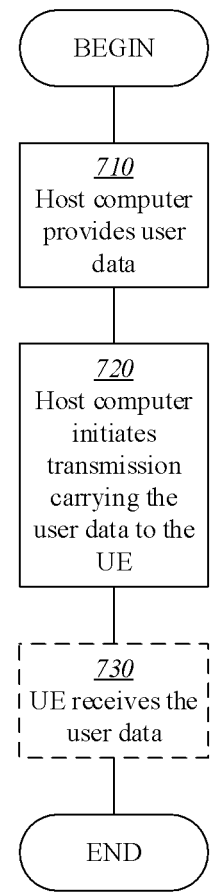

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In a first step 710 of the method, the host computer provides user data. In an optional substep (not shown) the host computer provides the user data by executing a host application. In a second step 720, the host computer initiates a transmission carrying the user data to the UE. The transmission may pass via the base station, in accordance with the teachings of the embodiments described throughout this disclosure. In an optional third step 730, the UE receives the user data carried in the transmission.

Figures 8, 9:
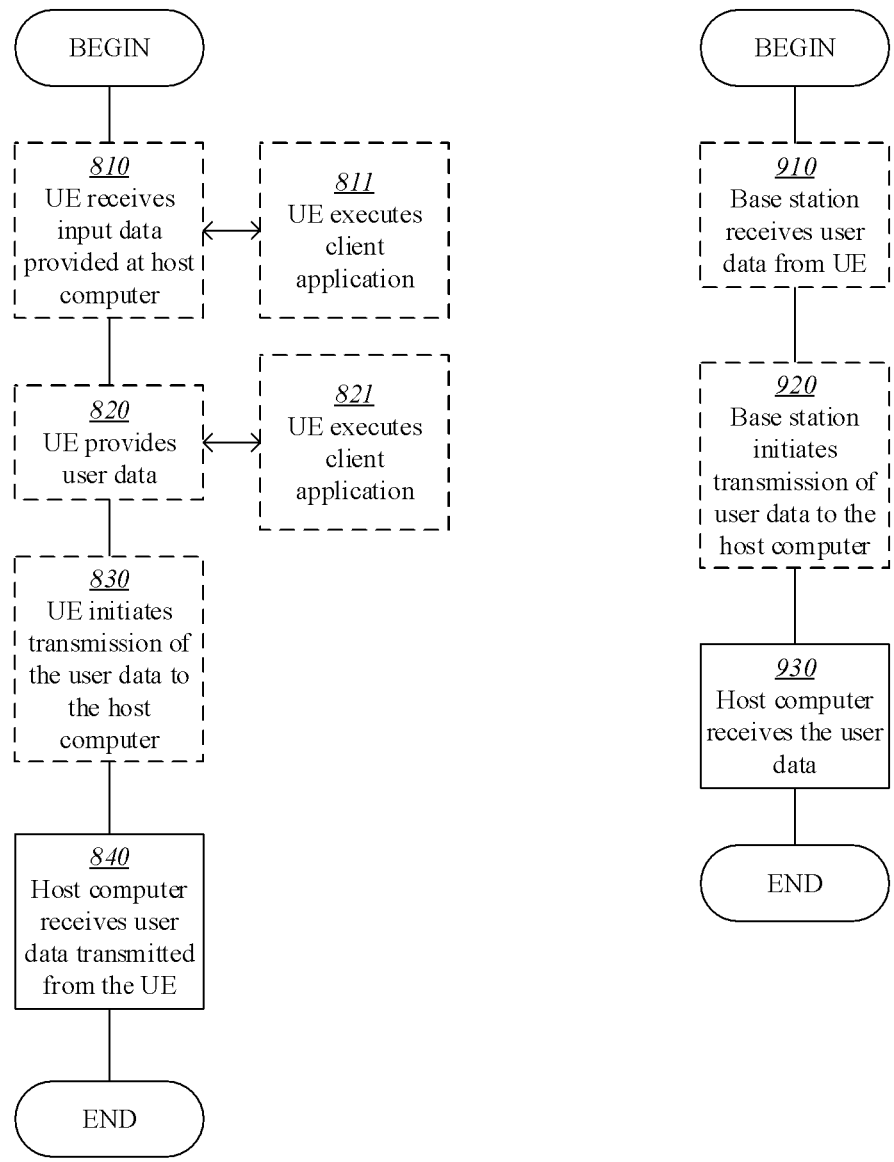

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In an optional first step 810 of the method, the UE receives input data provided by the host computer. Additionally or alternatively, in an optional second step 820, the UE provides user data. In an optional substep 821 of the second step 820, the UE provides the user data by executing a client application. In a further optional substep 811 of the first step 810, the UE executes a client application which provides the user data in reaction to the received input data provided by the host computer. In providing the user data, the executed client application may further consider user input received from the user. Regardless of the specific manner in which the user data was provided, the UE initiates, in an optional third substep 830, transmission of the user data to the host computer. In a fourth step 840 of the method, the host computer receives the user data transmitted from the UE, in accordance with the teachings of the embodiments described throughout this disclosure.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In an optional first step 910 of the method, in accordance with the teachings of the embodiments described throughout this disclosure, the base station receives user data from the UE. In an optional second step 920, the base station initiates transmission of the received user data to the host computer. In a third step 930, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device, comprising:
   determining a number, N, of sets of beam vectors by:
   creating a first set of beam vectors orthogonal to each other; and
   determining an n-th set of beam vectors each obtained by linear combination of two or more beam vectors from the (n−1)-th set of beam vectors, where N and n are integers and N≥n>1; and
   selecting from one or more of the N sets, a plurality of beam vectors for beamforming of a radio signal.

2. The method of claim 1, wherein the beam vectors in the first set are eigen vectors spanning a Hilbert space.

3. The method of claim 1, wherein the first set of beam vectors is created based on a Discrete Fourier Transform, DFT, based matrix.

4. The method of claim 3, wherein the DFT based matrix is:

$$W = \frac{1}{\sqrt{K}} \begin{bmatrix} 1 & 1 & 1 & 1 & \cdots & 1 \\ 1 & w & w^2 & w^3 & \cdots & w^{K-1} \\ 1 & w^2 & w^4 & w^6 & \cdots & w^{2(K-1)} \\ 1 & w^3 & w^6 & w^9 & \cdots & w^{3(K-1)} \\ \vdots & \vdots & \vdots & \vdots & \ddots & \vdots \\ 1 & w^{K-1} & w^{2(K-1)} & w^{3(K-1)} & \cdots & w^{(K-1)(K-1)} \end{bmatrix},$$

where $w=e^{-2\pi i/K}$, K is a number of beam vectors in the first set and i is an imaginary unit, and each column of W is one beam vector of the first set.

5. The method of claim 4, wherein each beam vector in the n-th set is obtained by linear combination of two or more adjacent beam vectors from the (n−1)-th set of beam vectors.

6. The method of claim 3, wherein the plurality of beam vectors are selected for beamforming of the radio signal for transmission to a terminal device based on an Angle of Arrival, AOA, of another radio signal from the terminal device.

7. The method of claim 1, wherein the first set of beam vectors is created based on a random matrix.

8. The method of claim 7, wherein the first set of beam vectors is created by:
   generating a random matrix X, where X is a K*K matrix;
   calculating $R=X^H X$, where $X^H$ is a Hermitian conjugate of X; and
   calculating an eigen decomposition of R as $R=Q^H DQ$, wherein each column of Q is one beam vector of the first set.

9. The method of claim 1, wherein the first set of beam vectors is created based on a channel matrix.

10. The method of claim 9, wherein the first set of beam vectors is created by:
    obtaining a channel matrix Hm for each of a number, M, of terminal devices, where $H_m$ is a $T_m \times T_A$ matrix for an m-th terminal device out of the M terminal devices, m is an integer and M≥m>1, $T_A$ is a number of antennas at the network device and $T_A=K$, and $T_m$ is a number of antennas at the m-th terminal device;
    calculating $R_m = H_m^H H_m$, where $H_m^H$ is a Hermitian conjugate of $H_m$;
    calculating a covariance of $R_m$ over the M terminal devices as $R=E(R_m)$, where E( ) denotes mathematical expectation; and
    calculating an eigen decomposition of R as $R=Q^H DQ$, wherein each column of Q is one beam vector of the first set.

11. The method of claim 1, wherein said selecting is based on one or more of:
    a maximum allowable number of beams for a full spatial coverage sweeping or repetition of the radio signal during a period of time to cover a serving area,
    a targeted transmission or reception beamforming gain for the radio signal, or
    an allowable latency and/or a maximum period for a successful transmission or reception of the radio signal above a predetermined probability.

12. The method of claim 1, wherein the radio signal comprises a System Information and Synchronization Signal Block, SSB, a Channel State Information—Reference Signal, CSI-RS, or a reference or payload signal for multi-layer or multi-user transmission.

13. The method of claim 12, wherein the plurality of beam vectors are selected from the $n_1$-th set when the radio signal is the SSB, or from the $n_2$-th set when the radio signal is the CSI-RS, or from the $n_3$-th set when the radio signal is the reference or payload signal for multi-layer or multi-user transmission, wherein $n_1$, $n_2$ and $n_3$ are integers and $N \geq n_1 \geq n_2 \geq n_3 \geq 1$.

14. A network device comprising a transceiver, a processor and a memory, the memory comprising instructions executable by the processor whereby the network device is operative to:
    determine a number, N, of sets of beam vectors by:
    creating a first set of beam vectors orthogonal to each other; and determine an n-th set of beam vectors each obtained by linear combination of two or more beam vectors from the (n−1)-th set of beam vectors, where N and n are integers and N≥n>1; and
    select, from one or more of the N sets, a plurality of beam vectors for beamforming of a radio signal.

15. A computer program product comprising a non-transitory computer readable storage medium having computer program instructions stored thereon, the computer program instructions, when executed by a processor in a network device, causing the network device to:
    determine a number, N, of sets of beam vectors by:
        creating a first set of beam vectors orthogonal to each other; and determine an n-th set of beam vectors each obtained by linear combination of two or more beam vectors from the (n−1)-th set of beam vectors, where N and n are integers and N≥n>1; and
    select, from one or more of the N sets, a plurality of beam vectors for beamforming of a radio signal.

\* \* \* \* \*